(12) United States Patent
Vernon

(10) Patent No.: US 6,188,274 B1
(45) Date of Patent: Feb. 13, 2001

(54) BOOTSTRAP CAPACITOR POWER SUPPLY FOR LOW VOLTAGE MOBILE COMMUNICATIONS POWER AMPLIFIER

(75) Inventor: George Stuart Vernon, Milwaukie, OR (US)

(73) Assignee: Sharp Laboratories of America, Inc., Camas, WA (US)

(*) Notice: Under 35 U.S.C. 154(b), the term of this patent shall be extended for 0 days.

(21) Appl. No.: 09/326,756

(22) Filed: Jun. 4, 1999

(51) Int. Cl.[7] ................................................ H03K 7/612
(52) U.S. Cl. ............................................ 327/589; 327/536
(58) Field of Search .................... 327/534, 535, 327/536, 537, 589, 390

(56) References Cited

U.S. PATENT DOCUMENTS

| | | | |
|---|---|---|---|
| 5,155,670 | 10/1992 | Brian | 363/24 |
| 5,381,051 | 1/1995 | Morton | 327/390 |
| 5,384,570 | 1/1995 | Dedic | 341/172 |
| 5,481,221 | 1/1996 | Gariboldi et al. | 327/536 |
| 5,493,245 | 2/1996 | Kao et al. | 327/333 |
| 5,512,845 | 4/1996 | Yuh | 326/88 |
| 5,514,994 | 5/1996 | Sawada | 327/396 |
| 5,543,750 | 8/1996 | Oh | 327/589 |
| 5,604,671 | * 2/1997 | Okamura | 363/60 |
| 5,612,921 | 3/1997 | Chang et al. | 365/266 |
| 5,627,460 | 5/1997 | Bazinet et al. | 323/288 |
| 5,635,776 | 6/1997 | Imi | 307/110 |
| 5,646,563 | 7/1997 | Kuo | 327/157 |
| 5,680,300 | 10/1997 | Szepesi et al. | 363/59 |
| 5,717,581 | 2/1998 | Canclini | 363/60 |
| 5,734,279 | 3/1998 | Bereza | 327/112 |
| 5,742,196 | 4/1998 | Fronen et al. | 327/382 |
| 5,767,735 | 6/1998 | Javanifard et al. | 327/536 |
| 5,768,115 | 6/1998 | Pascucci et al. | 363/59 |
| 5,877,948 | * 3/1999 | Dijkmans | 363/60 |

* cited by examiner

Primary Examiner—Terry D. Cunningham
Assistant Examiner—Quan Tra
(74) Attorney, Agent, or Firm—Robert D. Varitz, PC

(57) ABSTRACT

A power supply circuit for use with a RF power amplifier in a communications device includes a battery; a low impedance capacitor connected in series with the battery; a discharge blocking mechanism to prevent discharge of the capacitor until the occurrence of a triggering event; and a summing mechanism to combine the voltage from the battery with the voltage from the capacitor to power the RF power amplifier.

10 Claims, 2 Drawing Sheets

BOOTSTRAP CAPACITOR POWER SUPPLY FOR LOW VOLTAGE MOBILE COMMUNICATIONS POWER AMPLIFIER

FIELD OF THE INVENTION

This invention relates to power supplies, and specifically to a power supply for a mobile communications device that intermittently operates RF transmitter chains, such as an RF power amplifier.

BACKGROUND OF THE INVENTION

The prior art utilizes multiple-cell batteries to develop voltage required for operation of RF power amplifier, or provides a switching power supply to increase lower cell count battery voltage to RF power amplifier required operating voltage, with a capacitor to store the full voltage for use by the RF power amplifier.

U.S. Pat. No. 5,768,115, to Pascucci et al., for Voltage booster with an acceleration circuit, granted Jun. 16, 1998 describes a charge pump and a control system therefor.

U.S. Pat. No. 5,767,735, to Javanifard et al., for Variable stage charge pump, granted Jun. 16, 1998 describes a charge pump having the ability to generate a number of different output voltages.

U.S. Pat. No. 5,742,196, to Fronen et al., for Level-shifting circuit and high side driver including such a level-shifting circuit, granted Apr. 21, 1998 describes a circuit having a parasitic transistor therein.

U.S. Pat. No. 5,734,279, to Berezen, for Charge pump circuit, granted Mar. 31, 1998 describes a low-noise, relatively constant output circuit.

U.S. Pat. No. 5,717,581, to Canclini, for Charge pump circuit with feedback control, granted Feb. 10, 1998 describes a multiple stage charge pump circuit having a control portion that senses bias current of the switch circuit.

U.S. Pat. No. 5,680,300, to Szepesi et al., for Regulated charge pump DC/DC converter, granted Oct. 21, 1997 describes a charge pump circuit having a switch driver that generates a modulated drive voltage in response to the voltage output of the circuit, which drive voltage operates a switch, producing a regulated output voltage.

U.S. Pat. No. 5,646,563, to Kuo, for Charge pump with near zero offset current, granted Jul. 8, 1997 describes a charge pump which is less sensitive to jitter in the supply voltage and reference voltage.

U.S. Pat. No. 5,635,776, to Imi, for Charge pump voltage converter, granted Jun. 3, 1997 describes a circuit for boosting voltage by four or eight times the input voltage.

U.S. Pat. No. 5,627,460, to Bazinet et al., for DC/DC converter having a bootstrapped high side driver, granted May 6, 1997 describes a circuit for temporarily increasing the duty cycle of a low-side nMOS switch, thereby maintaining a minimum level charge on a bootstrap capacitor.

U.S. Pat. No. 5,612,921, to Chang et al., for Low Supply voltage Negative Charge Pump, granted Mar. 18, 1997 describes a charge pump for generating a relatively high negative voltage to control gates of selected memory cells.

U.S. Pat. No. 5,543,750, to Oh, for Bootstrap Circuit, granted Aug. 6, 1996 bootstrap circuit for use with binary signals.

U.S. Pat. No. 5,514,994, to Sawada, for Bootstrap circuit, granted May 7, 1996 describes a bootstrap circuit applicable to semiconductor memories.

U.S. Pat. No. 5,512,845, to Yuh, for Bootstrap circuit, granted Apr. 30, 1996 describes a circuit for enhancing the operating speed of a semiconductor memory device.

U.S. Pat. No. 5,493,245, to Kao et al., for Low power high speed level shift circuit, granted Feb. 20, 1996 describes a circuit having three sets of CMOS transistors to provide low power consumption at a high operating rate.

U.S. Pat. No. 5,481,221, to Gariboldi et al., for Charge pump circuit for low supply voltage applications, granted Jan. 2, 1996 describes a high-efficiency circuit that operates with a low supply voltage and without a high-current voltage regulating device.

U.S. Pat. No. 5,384,570, to Dedic, for Voltage storage circuits, granted Jan. 24, 1995 having a discharge block.

U.S. Pat. No. 5,381,051, to Morton, for High voltage charge pump, granted Jan. 10, 1995 describes a circuit that is operable over a range of low input voltages.

U.S. Pat. No. 5,155,670, to Brian, for Bootstrap modified topologies for wide-input range switchmode DC to DC converters, granted Oct. 13, 1992 describes a circuit wherein an input voltage is converted to an augmented voltage, and wherein the DC to DC converter then operates from the augmented voltage.

Although a large number of bootstrap/charge pump circuits exist in the prior art, none are as suitable for providing power to a RF power amplifier as the power supply of the invention.

SUMMARY OF THE INVENTION

A power supply circuit for use with a RF power amplifier in a communications device includes a battery; a low impedance capacitor connected in series with the battery; a discharge path block to prevent discharge of the capacitor until the occurrence of a triggering event; and a summing path to combine the voltage from the battery with the voltage from the capacitor to power the RF power amplifier.

DETAILED DESCRIPTION OF THE PREFERRED EMBODIMENT

The circuit of the invention provides a boosted potential for the intermittent operation of an RF power amplifier in a hand held transceiver, such as a cellular telephone operating in a time divisional multiple access (TDMA) mode. The circuit uses a single lithium ion cell battery, or three nickel-cadmium or nickel metal hydride cells, having an operating potential range of 4.2V to 3.0V, with 4.8V to 6.2V developed for the RF power amplifier (PA) using a low impedance 2.3V super capacitor to bootstrap the battery voltage. Most radio systems generally operate satisfactorily from the available potential of a single lithium ion cell, or three nickel cadmium or nickel metal hydride cells, however, newer systems incorporate a RF power amplifier which normally requires a larger potential to efficiently develop the required RF power at the antenna.

For hand held transceivers utilizing a single lithium ion battery, or three cells of either nickel cadmium or nickel metal hydride, the battery operating potential varies between 4.2V, at full charge, to 3.0V, at the end-of-life. During transmitter idle time, a super capacitor with low internal impedance, generally less than 0.2 Ohms, is charged from the battery. Before the transmitter is turned on, the charged super capacitor is placed in series with the battery in an operating configuration, to boost the potential by approximately 2.0V to the 4.8V to 5.2V, which is required by the RF power amplifier. The capacitor remains in series with the battery until the transmission burst is completed, and then is returned to a charge configuration to prepare for the next burst.

In the simplest implementation, the charge placed on the super capacitor is not adjusted for battery potential. Thus, the power amplifier operating voltage is allowed to vary from about 6.2V to 5.0V, following the battery potential as it is discharged over the battery's operating life.

Figure 1:
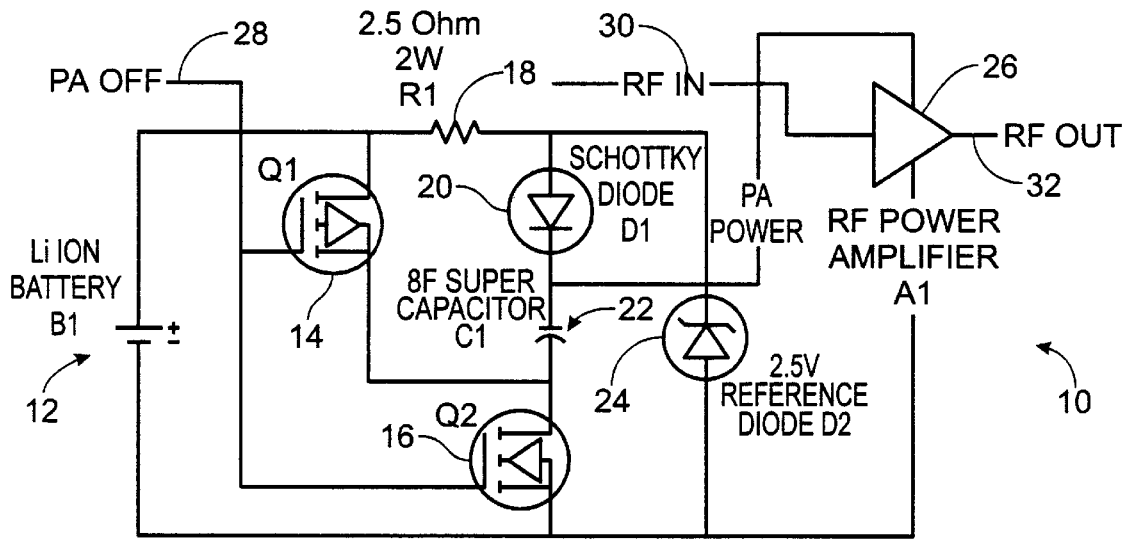
FIG. 1 is a schematic diagram of a first embodiment of an unregulated power amplifier power, bootstrap circuit of the invention.

Referring now to FIG. 1, a first embodiment of an unregulated power amplifier power, bootstrap circuit of the invention is shown generally at 10. Circuit 10 includes a battery 12, which is preferably of the lithium ion type, or three cells of either nickel cadmium or nickel metal hydride, having an operating potential which varies between 4.2V, at full charge, to 3.0V, at end-of-life. A first transistor 14 and a second transistor 16 are connected to battery 12, and serve as a switching mechanism. A resistor 18, in the preferred embodiment, is a two-watt, 2.5 Ohm resistor. A first diode 20, which, in the preferred embodiment, is a Schottky diode, is connected between transistor 16 and a capacitor 22. Capacitor 22, in this embodiment, is referred to as a super capacitor, and has a low impedance, on the order of less than 0.2 Ohms, and has a capacitance of eight Farads. A reference diode 24, which has a nominal 2.5V rating, and RF power amplifier 26 complete the circuit. Inputs to circuit 10 include PA-Off, 28, RF in, 30, and RF out, 32.

When PA Off control, 28, is high, capacitor 22 is charged to about 2.0V through the network consisting of resistor 18, diode 20, and transistors 14 and 16. Reference diode, or reference mechanism, 24 limits the total voltage applied to capacitor 22. When PA Off control 28 is low, which constitutes a triggering event, transistor 16 turns off and transistor 14 turns on, connecting capacitor 22 in series with battery 12. Transistor 14 comprises what is referred to herein as a summing mechanism for connecting battery 12 and capacitor 22 together in series with RF power amplifier 26. Diode 20 provides a discharge blocking mechanism and blocks the discharge path of capacitor 22 through resistor 18 and diode 24 when capacitor 22 is bootstrapped to battery 12 in this configuration. The voltage applied to RF PA 26 then includes the battery voltage summed with the voltage on capacitor 22. The operating voltage range for the RF power amplifier is 5.0V to 6.2V.

An alternate implementation will employ a regulator which will meter the potential placed on the super capacitor based on the battery potential, such that the voltage applied to the RF power amplifier remains constant over the discharge life of the battery.

Figure 2:
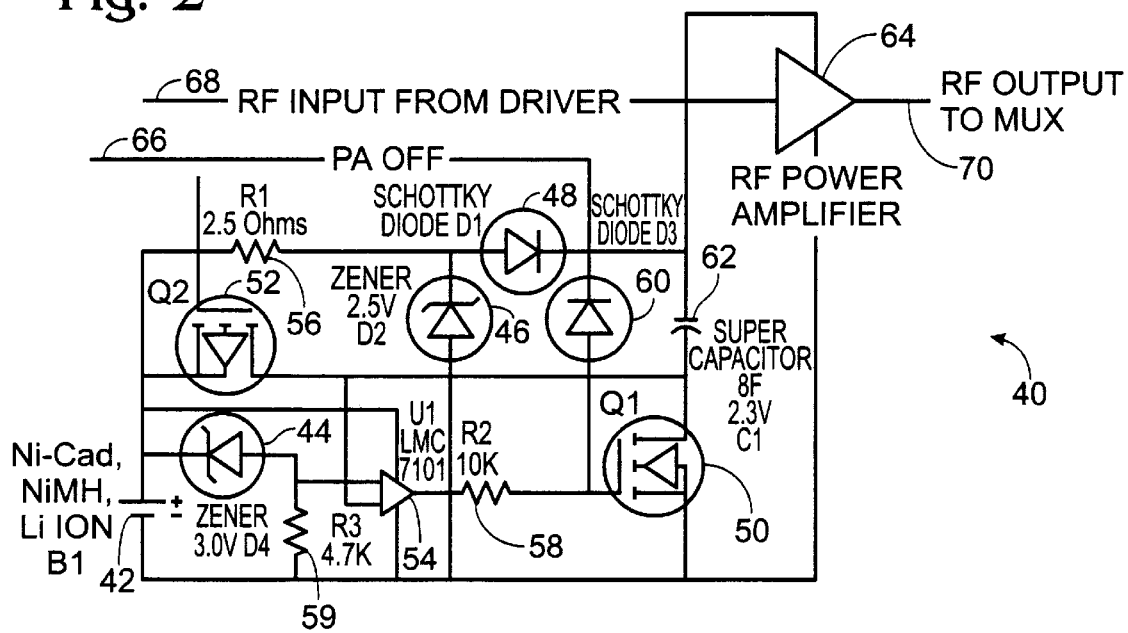
FIG. 2 is a schematic diagram of a second embodiment of the invention.

Referring now to FIG. 2 a regulated power amplifier power, bootstrap circuit of the invention is depicted generally at 40. Circuit 40 includes a battery 42, which again, may be a lithium ion or nickel-based cell(s), which is arranged in series with a 3V Zener diode 44, and a 2.5V Zener diode 46. A first Schottky diode 48 is arranged in parallel with battery B1. A first, n-channel MOSFET 50 and a second, p-channel MOSFET 52 comprise a switching mechanism for circuit 40. An op amp 54 provides bias adjustment within circuit 40. Current flow is modified in the circuit by a 2.5 Ohm resistor R1, 56, a 10K Ohm resistor R2, 58, and a 4.7K Ohm resistor R3, 59. A second Schottky diode 60 serve as a gate clamp for MOSFET 50. A capacitor, which in the preferred embodiment is a eight Farad super capacitor, having an impedance of less than or equal to 0.2 Ohms. A RF power amplifier 64 is powered by circuit 40. Input signals include a PA Off signal 66, a RF input 68 and an RF output 70.

When PA OFF 66 is high, MOSFET 52 is turned off, and MOSFET 50 is enabled. Zener diode 44 provides a reference voltage for driving MOSFET 50 to adjust the charge on capacitor 62 based on the battery voltage. Diode 44 and MOSFET 50 comprise what is referred to herein as a reference mechanism. As the battery voltage decreases, op amp 54 adjusts the bias on MOSFET 50 to increase the voltage developed across capacitor 62. Op amp 54 and MOSFET 50 comprise what is referred to herein as a charge adjusting mechanism. Zener diode 46, in conjunction with resistor 56, acts to limit the maximum voltage applied to super capacitor 62.

When PA OFF 66 is taken low, a triggering event, diode 60 clamps the gate of MOSFET 50 to ground, forcing it off, while MOSFET 52, the summing mechanism, is turned on, placing super capacitor 62 in series with battery 42 to supply RF power amplifier 64. Diode 48 isolates the positive side of capacitor 62 from battery 42. The voltage applied to RF power amplifier 64 is:

$$V_{pa} = V_{bat} + V_{cap}.$$

The voltage developed across the capacitor is:

$$V_{cap} = 2.0V - (V_{bat} - 3.0V) = 5.0V - V_{bat}.$$

Substituting into the equation for $V_{pa}$:

$$V_{pa} = V_{bat} + 5.0V - V_{bat}, \text{ or } V_{pa} = 5.0V.$$

For a super capacitor value of 8 F, the change in voltage while the capacitor and battery power the RF power amplifier is:

$$dV = I*dt/C.$$

For a typical global system for mobile communications (GSM) handset developing 2W at the antenna, dt=2.5 ms, I=1.6 A, and given C=8 F:

$$dV = 1.6*0.0025/8 = 500 \text{ uV}.$$

For the recovery time, dt=17.5 ms, C=8 F, and dV=500 uV, so:

$$I = 8*0.0005/0.0175 = 229 \text{ mA}.$$

If the internal impedance of the super capacitor is taken into account, then the voltage will drop by:

$$V = I*R = 1.6*0.125 = 0.2V.$$

If the battery impedance is also of the order of 0.05 Ohms, then the total terminal drop will be about 0.28V, such that the applied voltage to the power amplifier will be 4.72V under full load. To account for the disparity, the open circuit charge placed on the super capacitor can be increased by reducing the value of the reference Zener diode 44 from 3.0V to 2.7V.

Figure 3:
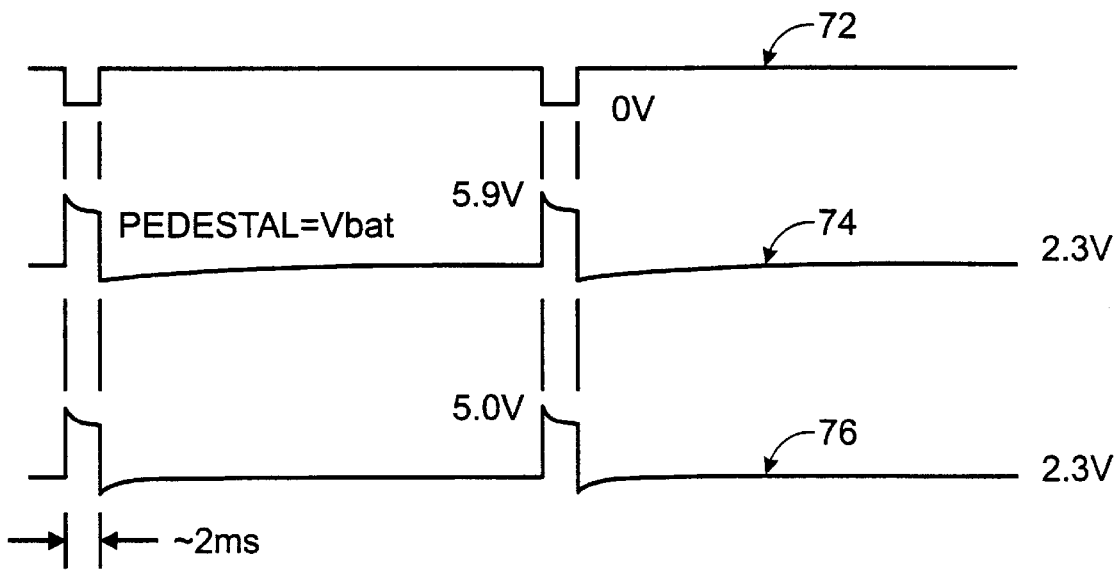
FIG. 3 illustrates waveforms applied to the power amplifier under various circumstances.

Referring to FIG. 3, waveforms applied to PA by the circuitry of the two embodiments is shown, along with their respective timing relationships with the PA power control signal. Waveform 72 is illustrative of a power off condition. Waveform 74 is illustrative of PA power diode 20 to super capacitor 22 in FIG. 1, while waveform 76 is diode 60 to super capacitor 62 in FIG. 2.

Thus, a bootstrap circuit has been disclosed that is suitable for use in portable communications devices, such as telephones. The circuit allows the use of a relatively low power battery yet still produces sufficient power to energize a RF power amplifier when the unit is in a transmit mode.

Although two embodiments of the invention have been disclosed herein, it will be appreciated that further modifications and variations may be made thereto without departing from the scope of the invention as defined in the appended claims.

I claim:

1. A power supply circuit for use with a RF power amplifier, requiring an operating voltage of about 5.0V, in a communications device, comprising:

a battery for supplying less than about 4.5V;

a low impedance capacitor connected in series with said battery for boosting voltage to greater than 4.8V;

a discharge path blocking mechanism to prevent discharge of said capacitor until the occurrence of a triggering event;

a charge adjusting mechanism to adjust a charge on said capacitor as a function of the voltage on said battery; and a summing mechanism to combine the voltage from said battery with the voltage from said capacitor to power the RF power amplifier at a voltage of about 5.0V.

2. The circuit of claim 1 wherein said capacitor is a super capacitor and wherein said capacitor has an impedance less than or equal to 0.2 ohms.

3. A power supply circuit for use with a RF power amplifier in a communication device, comprising:

a battery having a variable output voltage;

a capacitor;

a switching mechanism located between said battery and said capacitor, including a first transistor and a second transistor for alternately charging said capacitor to a predetermined level and for connecting said battery and said capacitor in series with the RF power amplifier upon the occurrence of a triggering event;

a first diode for blocking discharge of said capacitor; and a reference mechanism for controlling the amount of charge placed on said capacitor.

4. The circuit of claim 3 wherein said reference mechanism includes a reference diode.

5. The circuit of claim 3 wherein said reference mechanism includes a Zener diode and a first resistor.

6. The circuit of claim 3 which includes a charge adjusting mechanism for adjusting the charge on said capacitor as a function of said battery output voltage.

7. The circuit of claim 6 wherein said charge adjusting mechanism includes an op amp and said first transistor.

8. The circuit of claim 6 wherein said battery voltage is variable between about 3.0V and about 4.2V, and wherein said capacitor voltage output varies between about 0.8V to about 2.0V.

9. The circuit of claim 3 wherein said battery voltage is variable between about 3.0V and about 4.2V.

10. The circuit of claim 3 wherein said first transistor is an n-channel MOSFET and wherein said second transistor is a p-channel MOSFET.

* * * * *